(12) United States Patent
Riener et al.

(10) Patent No.: US 8,403,677 B2
(45) Date of Patent: Mar. 26, 2013

(54) INTERACTIVE TEACHING AND LEARNING DEVICE

(76) Inventors: Robert Riener, Wangen (CH); Rainer Burgkart, München (DE)

( * ) Notice: Subject to any disclaimer, the term of this patent is extended or adjusted under 35 U.S.C. 154(b) by 542 days.

(21) Appl. No.: 12/397,758

(22) Filed: Mar. 4, 2009

(65) Prior Publication Data

US 2009/0162823 A1  Jun. 25, 2009

Related U.S. Application Data

(63) Continuation of application No. 10/541,295, filed as application No. PCT/DE03/04292 on Dec. 31, 2003, now abandoned.

(30) Foreign Application Priority Data

Dec. 31, 2002  (DE) .................................. 102 61 673

(51) Int. Cl.
  *G09B 23/28* (2006.01)
  *G09B 25/00* (2006.01)
(52) U.S. Cl. .......................... 434/267; 434/275; 434/365
(58) Field of Classification Search .................. 434/262, 434/267, 365, 275; 345/173; 702/41, 139
  See application file for complete search history.

(56) References Cited

U.S. PATENT DOCUMENTS

| | | | | |
|---|---|---|---|---|
| 3,742,935 A | * | 7/1973 | Baessler et al. | 600/500 |
| 4,254,562 A | * | 3/1981 | Murray | 434/267 |
| 4,843,891 A | | 7/1989 | Brunner et al. | |
| 5,259,764 A | | 11/1993 | Goldsmith | |
| 5,376,948 A | * | 12/1994 | Roberts | 345/173 |
| 5,400,661 A | * | 3/1995 | Cook et al. | 73/862.43 |
| 6,141,000 A | * | 10/2000 | Martin | 345/178 |
| 6,597,347 B1 | * | 7/2003 | Yasutake | 345/173 |
| 6,915,709 B2 | * | 7/2005 | Okada | 73/862.41 |
| 2005/0246109 A1 | * | 11/2005 | Bang et al. | 702/41 |

FOREIGN PATENT DOCUMENTS

| | | |
|---|---|---|
| DE | 36 42 088 C2 | 6/1988 |
| DE | 100 17 119 A | 10/2001 |
| WO | WO 02/37453 | 5/2002 |
| WO | WO 03/090179 | 10/2003 |

* cited by examiner

*Primary Examiner* — Xuan Thai
*Assistant Examiner* — Peter Egloff
(74) *Attorney, Agent, or Firm* — Henry M. Feiereisen LLC

(57) ABSTRACT

The invention relates to a device which allows to preferably explain and demonstrate three-dimensional objects, such as anatomic models or also models and exhibits for museums and fairs. According to the invention the model 1 is fastened to the adjacencies by at least one multiple-component force-torque measurement device 2, includes an electronic storage and evaluation unit and an optic-visual and/or acoustic indicating device. The force-torque measurement device 2 converts the forces and moments arising when the model 1 is touched into electrical measurement signals to be leaded to the electronic storage and evaluation unit, and in the electronic storage and evaluation unit the contact zone is calculated from the forces and torques detected as a result of the touch, and is communicated to the operator as a signal by means of the optic-visual and/or acoustic indicating device.

5 Claims, 6 Drawing Sheets

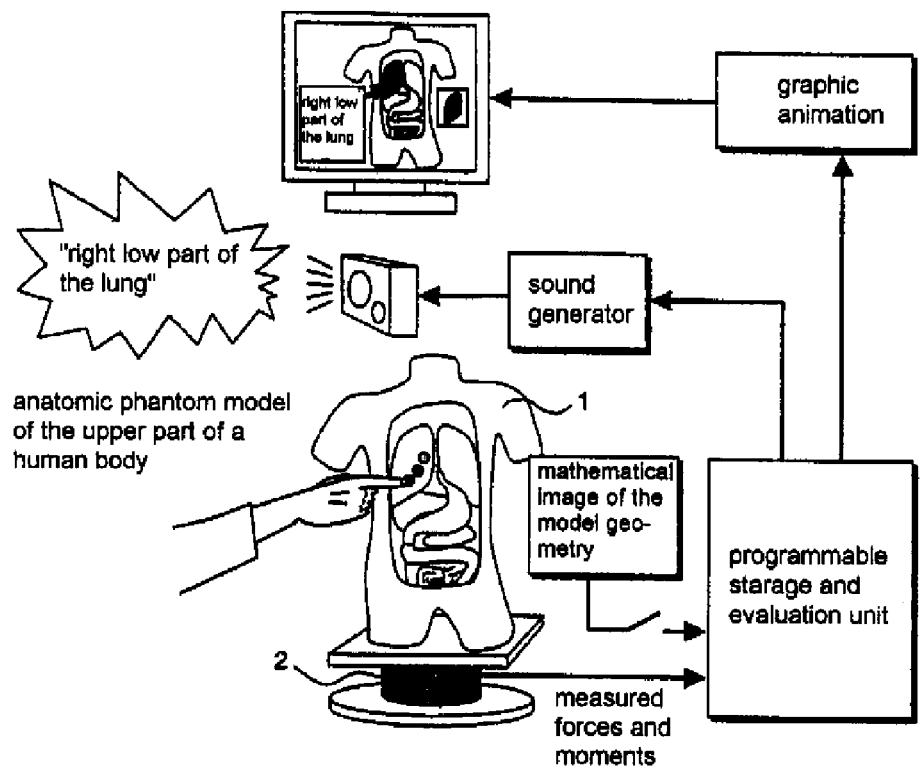
Fig. 1a
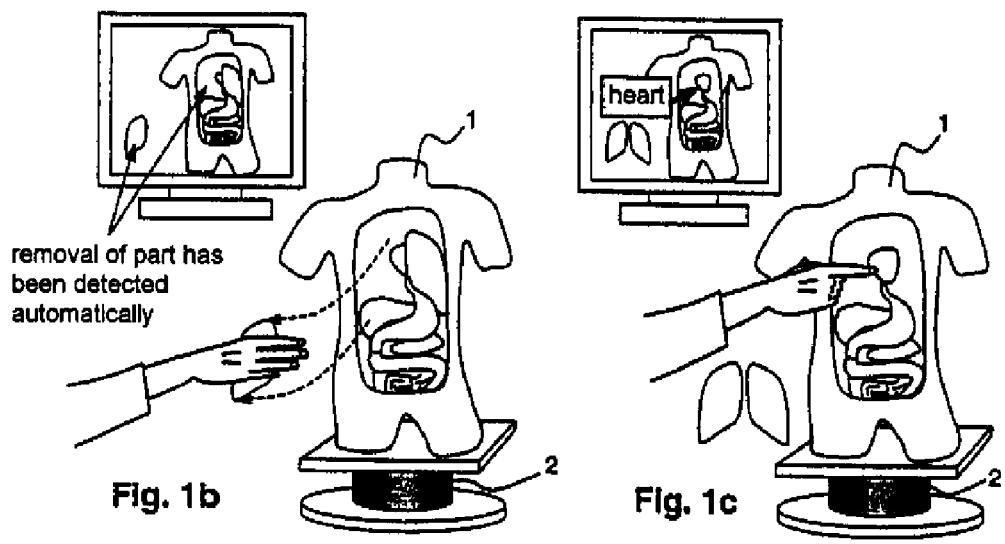
Fig. 1b
Fig. 1c

INTERACTIVE TEACHING AND LEARNING DEVICE

CROSS-REFERENCES TO RELATED APPLICATIONS

This application is a continuation of prior filed copending U.S. application Ser. No. 10/541,295, filed Jul. 18, 2005, the priority of which is hereby claimed under 35 U.S.C. §120 and which is the U.S. National Stage of PCT International Application No. PCT/DE03/04292, filed Dec. 31, 2003, which designated the United States and has been published but not in English as International Publication No. WO 2004/061797 and which claims the priority of German Patent Application, Serial No. 102 61 673.6, filed Dec. 31, 2002, pursuant to 35 U.S.C. 119(a)-(d).

The contents of U.S. application Ser. No. 10/541,295, International Application No. PCT/DE03/04292, and German Patent Application, Serial No. 102 61 673.6 are incorporated herein by reference in its entirety as if fully set forth herein.

BACKGROUND OF THE INVENTION

The invention relates to a device which allows to preferably explain and demonstrate three-dimensional objects, e.g. anatomical models or even models and exhibits for museums and fairs.

In the field of medical training or in medical demonstrations anatomical models of plastic material or other materials are frequently used. For the explanation or accentuation of certain anatomical areas it is often advisable to mark the relative areas by inscriptions or coloured signs.

The problem with regard to such models is that for the reason of lack of space the information to be imparted by means of an inscription must not be very voluminous. In many cases the inscription is completely omitted, as, for example, the texture of the model (colouring, fine vessels, nerves etc., are to remain recognizable. Therefore the names and informative details belonging to the individual areas of a model are listed on a sheet of paper. The assignment follows from numbers indicated on the model, or from sketches or photos which show the relative areas of the model. Therefore the identification of the model areas of interest is often very complicated and unclear.

The same problems apply to the construction of three-dimensional demonstration models shown in museums or at fairs, in which cases—contrary to medical models—even original objects, such as an oldtimer vehicle in an automobile museum, may be concerned.

Regarding these museum and fair models it may also be advisable to make inscriptions or coloured marks for illustrating, describing or accentuating certain areas or elements of the model. For this purpose electrical switches are often used which—after being touched on the model or away from it—ensure that a certain area of the model becomes visible by means of small incandescent lamps or is explained by means of an inscription lighted up. So-called touchpads are used for special applications allowing the detection of a flat force distribution on the basis of sensing elements arranged in a matrix array, please see also DE 36 42 088 C2. The disadvantage of such arrangements is that there are sensor components between the touched model and the operator so that the original contact properties, such as surface condition, shape and colour, are distorted. Furthermore, owing to the mounting of the sensor components the model to be touched has to be processed. As a result the model may be changed or even damaged. Further, in order to achieve a sufficient level of space resolution over the whole of the concerned model area, a plurality of sensors sensitive to pressure have to be used.

These disadvantages are partly removed by the usage of so-called navigation or tracking systems which detect the contact point not on the side of the model but on the side of the operator, e.g. by tracking the operator's finger or instrument. The range of equipment required for the detection of the operator's movement, however, is excessive.

SUMMARY OF THE INVENTION

Therefore it is the object of the invention to provide improved models for learning and demonstrating purposes which, above all, overcome the above mentioned disadvantages.

This task is solved by a device according to claims 1 and 2:

According to claim 1 a teaching and learning device showing the following characteristics is provided: A 3D body incorporating the model is fastened to the adjacencies by at least one multi-component electrical force-torque measurement device. When the 3D body is touched the forces and torques arising are converted into electrical measurement signals which are leaded to an electronic storage and evaluation system. In the electronic storage and evaluation system a mathematical model of the geometry of the 3D body is implemented. Hereinafter geometry means at least each surface area of the model which can be contacted and which is to be explained, i.e. also body hollows of an anatomical model.

Furthermore an algorithm known as such from the state of the art is implemented, which calculates the place at the 3D body just being touched, for example by a finger or a needle, from the forces and torques detected as the result of the contact.

The calculated place of the contact is indicated or displayed by means of an indicating device. The mode of indication and/or output is optional and is executed in accordance with the purpose to be achieved. Optic-visual and/or acoustic indicating devices as known from the state of the art are preferred.

The invention according to claim 2 as an invention on its own is subordinated to the same basic idea as the invention according to claim 1.

The fundamental difference, however, is that no mathematical model is stored in the electronic storage and evaluation system, but a data table in which the contact points of interest are stored.

These contact points are implemented by means of the "teaching" method known from the state of the art, which means that the place to be "taught" on or in the 3D body (for example a body hollow) is touched by a finger or an instrument, thereby applying a predetermined force which is transferred to the multiple-component force-torque measurement device.

The forces and torques detected by the multiple-component force-torque measurement device are compared with the data stored in the data table. By means of an assignment algorithm the place touched is detected and displayed by the indicating device. Contrary to the invention according to claim 1, which, on principle detects any point as far as it is covered by the mathematical model, the invention in accordance with claim 2 can practically detect the pre-taught points only.

The model is fastened to a table, a wall, a ceiling or any other base surface by only one multiple-component force-torque measurement device. For the reason of a better mechanical stability even several force measurement devices may be used. Multiple-component force-torque measurement devices are part of the state of the art and are commercially offered as modular components. Additional holding appliances may also be used if required by the dimensions of the 3D body. These holding appliances, however, must be constructed in a way to unambiguously and reproducibly feed the force caused by the touch to the force-torque measurement device or the force-torque measurement devices.

The outstanding feature compared with the devices hitherto known is that the touch-sensitive sensor system is not positioned at the touch point of the model but is arranged as connecting element between the model and the adjacencies. For this reason there is no need to expensively adapt the model. Furthermore nearly any number of touch points may be generated, which is not possible with regard to the devices of the known art.

The construction as mentioned above allows to visually and/or acoustically explain, describe or accentuate the areas, points of elements of the model touched by the operator. For example the details shown may be the name, certain properties and functions of the area or element of the identified model. The details are made readable or visually recognizable by means of a visual display unit, and/or audible by means of loudspeakers. Also films or graphic animations can be imported depending on what kind of setting and operating activities have been made. Further the amount of the force detected and the direction of the force detected can be further processed by the data processor and reproduced as a graphically animated vector arrow or as an acoustic signal. If for example, the operator applies too high forces to the model a visual or acoustic warning signal or a warning voice may ensure that the operator stops applying force to the model so as to avoid a destruction of the model or the force sensor.

The mathematical representation of the used model can be determined by means of 3D-scanners (CT, magnetic resonance tomography, laser scanner etc.) and stored in a data processor. When the teaching method is used the relative areas of the model are touched, and the thereby arising forces and torques are measured and stored and assigned, for example by the input of texts. In this case the assignment method can be supported by up-to-date techniques such as artificial neural networks. As soon as in the course of the later application forces arise which are comparable with those measured in the teaching process, the element touched is detected automatically.

The geometric image of the model can also be represented in a graphically animated way. In the animation certain areas of the model which are touched can be marked by colour or by means of an arrow. Even very fine details which are positioned near the touch point but cannot be marked on the real model for lack of space can be visualized by means of the visual display unit.

On the model or within certain predetermined areas of the model several distinguishable menu points which optically differ in colour, size, shape, inscription can be marked. If one of these menu points is touched, depending on the kind of the point a certain reaction is released or menu function is executed which is displayed acoustically or graphically.

Alternatively or in addition to the points which are optically distinguishable, certain touch patterns with typical force/time behaviours may lead to various graphic and acoustic responses. Such touch patters are for example: long or short contacts, light or strong contact pressing, as well as tapping signs with varying numbers of taps such as the double click in the Windows programme which leads to the opening of a file.

The invention can be operated in two different modes. The above mentioned function represents the so-called standard mode, in which the touch results in a graphic and/or acoustic response. In the so-called inquiry mode at first a graphic or acoustic request can be put to the operator such as to touch a certain area of the model. Thereupon the operator, e.g. a student to be examined, touches the supposed area, and the data processor checks whether the correct area has been touched, i. e. detected. As a result it is further possible to verify whether the operator has contacted the areas in the right order and, if required, also in the correct periods of time and by applying the correct amounts and directions of forces. Success, failure or a valuation are then communicated to the operator by means of the graphic and/or acoustic display. By using this mode the operator's knowledge is tested.

According to claim 3 the optic-visual indicating device includes a projector which projects visual data such as texts or images directly to the area touched, which also allows to project the reverse sides. It is required, however, that the colour and the surface of the model area are adjusted to match the projection. If, for example, the operator with growing force presses the lung of the model, more low-lying sections are projected and represented. It is known to the specialist that such projections can be shown on separate monitors as well.

According to claim 4 the projector is provided as video projector. This, for example, allows to show the blood transportation in the lung in a way very similar to reality, thus further improving the informative effect.

Further it is to be mentioned that there is a number of intelligent algorithms for the evaluation of the signals of the force-torque measurement device. In case of a dismountable anatomic model, for example, the remaining mass is reduced when an organ is removed. Therefore, if the masses of the dismountable organs are different and known, it is possible to determine the dismounted organ by a simple weight classification. It is further possible to utilize the shifting of the centre of gravity of the model on removal of an organ for the determination. If a certain organ is removed, on principle the force-torque measurement device does not only record a reduction in weight but also a tilting moment. To minimize the possibility of confusion it is further possible to provide for algorithms for plausibility checks. Consequently, if, for example, two organs are of the same weight, however, are positioned one behind the other and therefore can be removed only in the predetermined order, the organ just removed can be clearly identified.

Now the description of the invention will be made at greater detail by means of examples of embodiments and schematic drawings:

DETAILED DESCRIPTION OF PREFERRED EMBODIMENTS

FIG. 1a shows an artificial open upper part of a body 1 (phantom torso) with dismountable organs. In this embodiment the invention serves to support the medical training. The torso is mounted on a 6-component force-torque sensor 2.

The sensor data lead to a data processing unit with graphic and acoustic output. On the individual organs there are several small dots in yellow, blue and green colour. If, for example, a student of medicine touches one of the organs or a certain area of an organ, the name of the relative organ or area is communicated to him acoustically. Simultaneously a monitor shows the torso as artificial image in a shaded way and the name of the area touched is inserted. By the way of graphic animation the touched structures can be accentuated in colour. Even very fine anatomic structures, such as blood vessels, veinlets, lines of nerves, base points of muscles, can be made visible. If then an operator touches the yellow dot on the artificial organ of the torso, a photorealistic view of the organ or the area of the organ is represented to him on the monitor. In case of the blue dot the physiological relevance and possible pathologies are graphically and acoustically described. After all the green dot allows to start the graphic animation and films with sound. Further by an increase in pressure on an organ or the skin of the torso model it becomes possible to dip into the depth like a pin prick. As a result various body sections and internal sights are graphically represented in an animated way. In the inquiry mode (control mode) an artificial voice can request the operator to touch a certain area which is relevant from the anatomic point of view. The place touched is then recorded by the data processing unit and the result is acoustically and graphically communicated and commented to the operator.

FIG. 1b shows the operator removing one of the organs from the torso. As a result the sensor records an amended weight and a shifting of the centre of gravity. As the weights of the individual components are known, the sensor automatically detects the organ which has been removed. Thereupon the artificial display of the torso on the monitor adjusts itself according to the amended torso.

FIG. 1c shows how after the removal of several parts of organs more low-lying structures that have not been visible so far become visible now and can be explored further by touching them and by means of acoustic-graphic support.

Figure 1D:
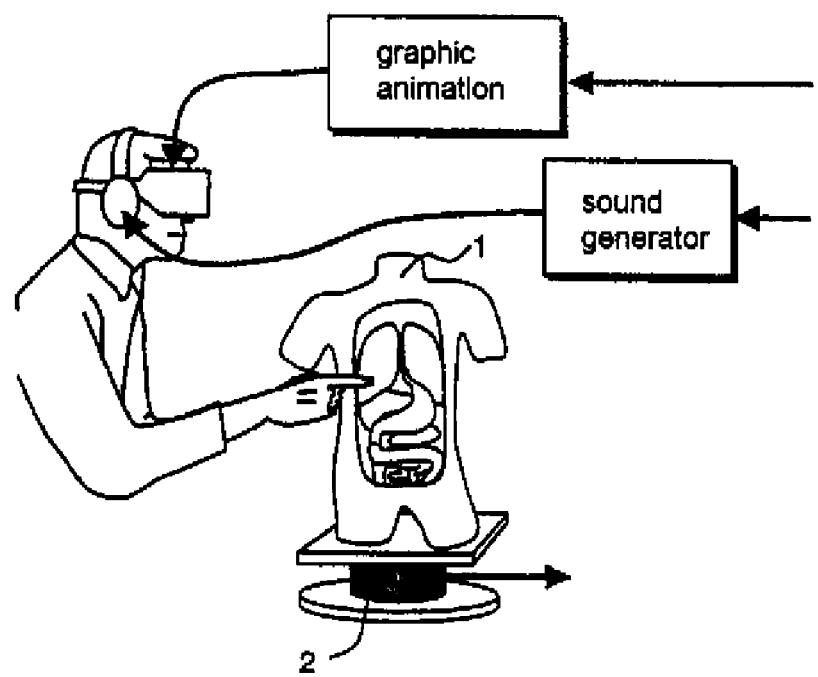
FIG. 1a-f show the application of the invention to a model of an anatomic torso.

FIG. 1d shows a different graphic and acoustic display using a head-mounted-display (HMD). By the projection of two separate images to both eyes a realistic three-dimensional image impression is achieved. The acoustic message is communicated to the operator by means of stereo headphones.

Figure 1E:
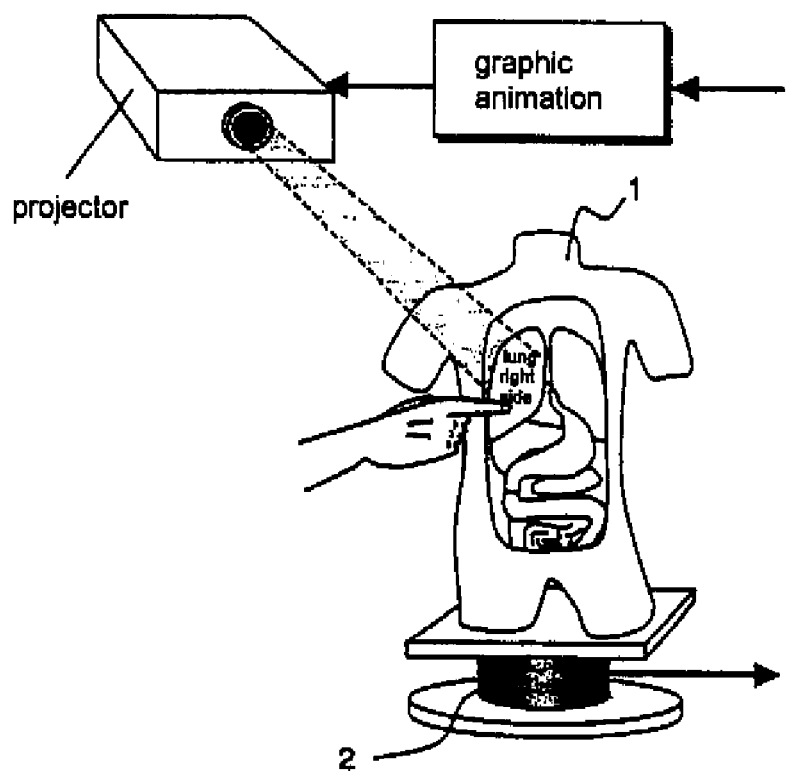
Figure 1:
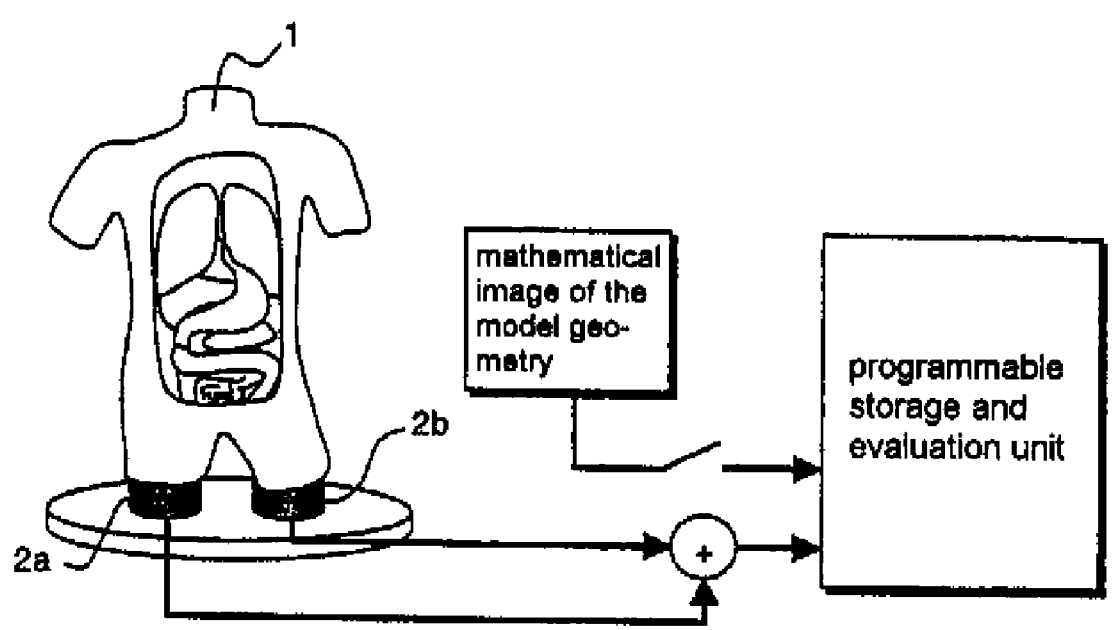

FIG. 1e shows a different graphic display in which the text and image data are projected directly to the touched model. This can be realized by means of a commercial projection beamer, in which case as for this example the model surface is to be white or unicoloured in a light colour.

FIG. 1f shows an embodiment in which the phantom torso is fastened by two multiple-component sensors 2a, 2b. The relative force-torque signals are vectorially added up and finally further processed by the data processing unit as sum signal which corresponds to the signal of one single sensor.

Figure 2:
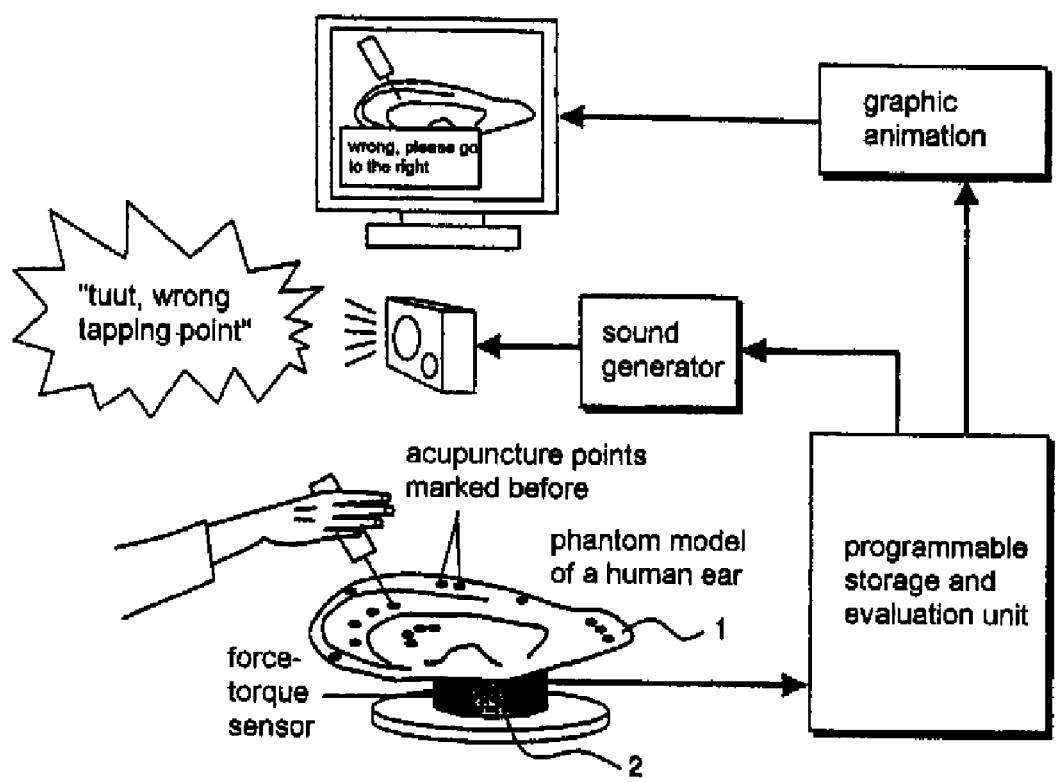
FIG. 2 shows the application of the invention to a model ear for the training in acupuncture.

FIG. 2 shows an embodiment in which a phantom ear is utilized for the acupuncture training. The phantom ear is connected with a force-torque sensor 2. The ear shows marks of the most important acupuncture positions. If the operator by means of a sharp-pointed object which is similar to an acupuncture pin touches the phantom ear, a voice and the monitor image tell him the name and the effect of the aimed dot. In this example of application the acoustic information and the text insertions are meaningful also for the reason that there is not enough space on the ear for the names and effects of the dots. Sound and image can also guide the operator when he looks for a desired dot. Further it is also possible to check how much time is taken by the operator to look for a certain dot and in which sequence he approaches these dots.

Figure 3:
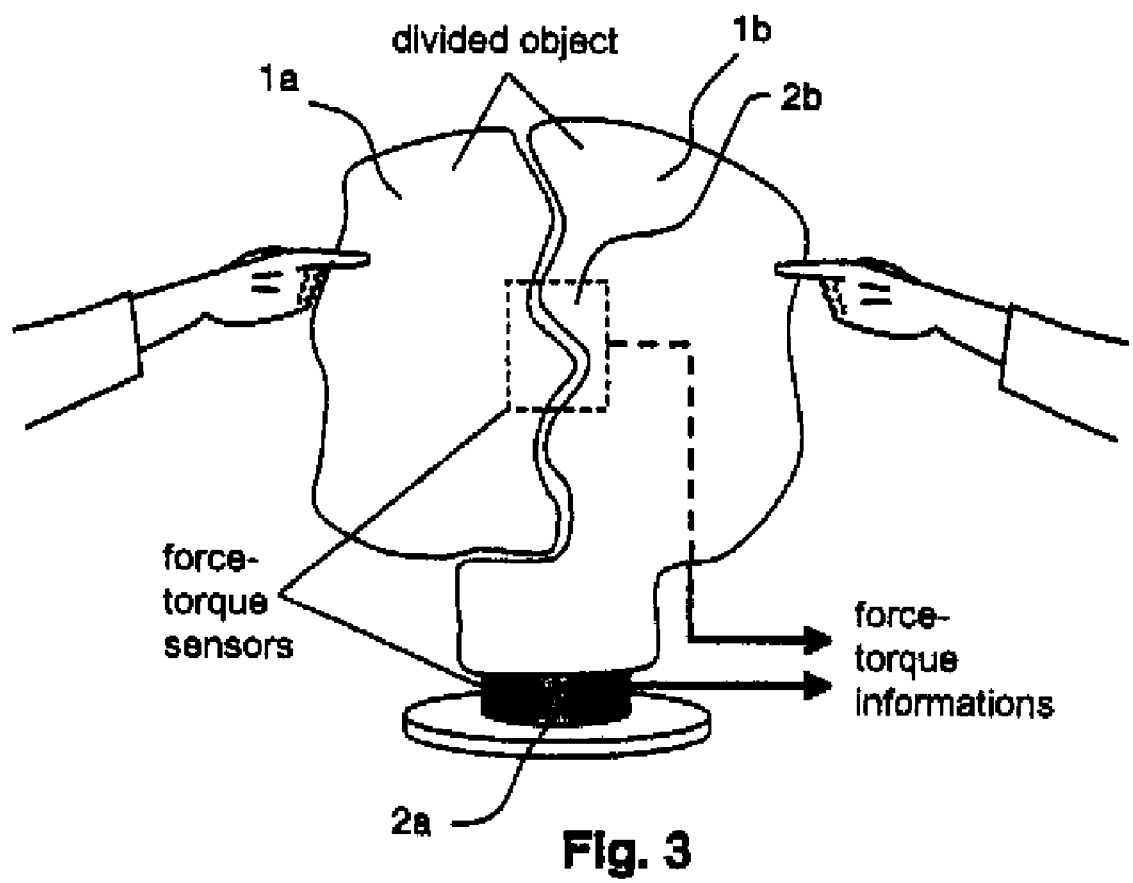
FIG. 3 shows an embodiment with divided model.

FIG. 3 shows an embodiment in which the model is divided. This means that the right model part is connected with the table by a force-torque sensor 2a. The left model part, however, is connected with the right model part by means of a further force-torque sensor 2b. The sensor 2b is the only connecting element between the right and the left model parts. By this arrangement 2 forces—one per model part—can be initiated and localized. This arrangement also allows ambidextrous pointing activities. During the data processing the forces active at the left part can unambiguously be further processed by the connecting sensor 2b. As, however, the sensor 2a on the side of the table receives the forces of both model parts, it is necessary for the localization of the right contact point that both sensor ends are coupled to each other. For this purpose the force-torque data of the connecting sensor are component for component subtracted, i.e. vectorially, from the force-torque data of the sensor on the side of the table (in a common coordinate system).

Figure 4:
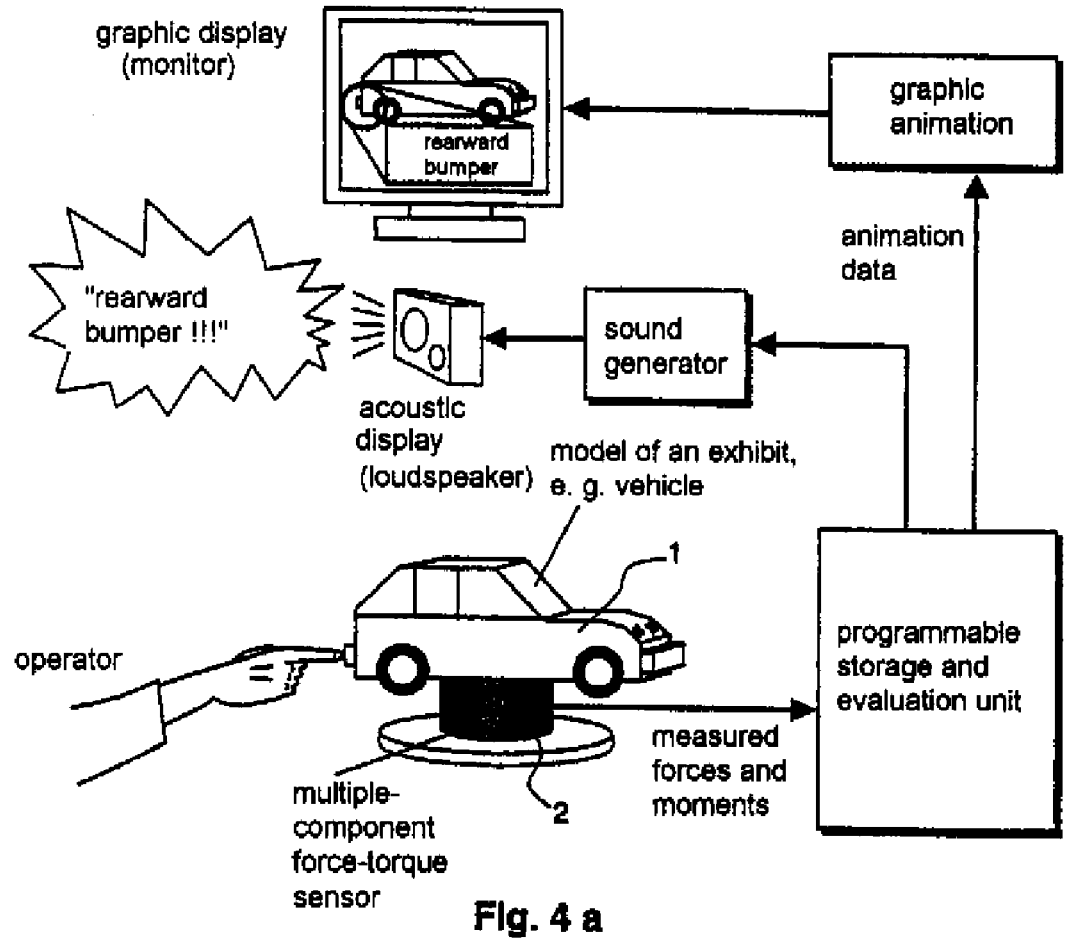
FIG. 4a, b show an embodiment of the invention for a non-medical application.
Figure 4:
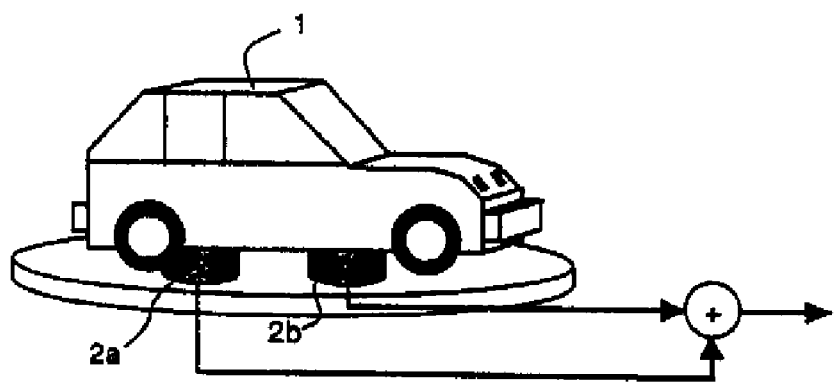

FIG. 4a shows a model car mounted on a 6-component force-torque sensor 2. The force-torque data are leaded to a data processing unit which has an acoustic output facility by means of a sound generator (sound card). The data processing unit includes a mathematical image of the model car geometry. The model cars is composed of a plurality of small components, such as wheels, doors, bumpers, headlights. As soon as the operator (visitor of a museum) shortly touches one of the components by his finger, he hears the name of the touched component by means of loudspeakers. If he two times in a row quickly taps the same element, its function is explained to him in more detail. Simultaneously with the output of the acoustic information the monitor shows an animated image of the model with a coloured accentuation of the touched part and a text box which explains the function in more detail. One single long tapping starts a short film which describes the manufacturing process of the touched part.

FIG. 4b shows an embodiment in which the model car is fastened by two multiple components 2a, 2b. The relative force-torque signals are vectorially added and finally as a sum signal which corresponds to the signal of a single sensor further processed by the data processing unit.

It is obvious that instead of the model car also a real object such as an automobile can be equipped with the invention. The particular significance in the fields of application: museum, exhibition or fair, without doubt, consists in the novel interaction of the exhibited object with the public that up to this time often has not been allowed to touch the exhibits.

What is claimed is:

1. An interactive teaching and learning device which comprises:
   a first 3D body,
   a second 3D body,
   wherein the first and second 3D bodies are combined to a uniform 3D model which allows it to be touched by a person to explain where certain regions, spots or elements of the 3D model are situated,
   a first force-torque multiple-component measurement device connecting the first 3D body and the second 3D body with each other,
   a second force-torque multi-component measurement device firmly connecting the second 3D body with its adjacencies,
   an electronic storage and evaluation system,
   an optic-visual and/or acoustic indicating device,
   wherein the forces and torques measured when certain regions, spots or elements of the first and second 3D bodies are touched, are converted into electrical measurement signals to be fed to the electronic storage and evaluation unit, in which either a mathematical model having a geometry of the first and second 3D bodies and an algorithm for determining, based on the measured forces and toques, the region, spot or element touched by a person, are implemented, or a plurality of touchable spots are stored and an interpretive algorithm is implemented, which determines based on the measured forces and torques, the region, spot or element touched by a person, wherein when the first and second 3D bodies are touched by a person at the same time, the measurement signals sent by the first force-toque multi-component measurement device are assigned to the first 3D body, and a difference between the measurement signals sent by the second force-torque multi-component measurement device and the measurement signals sent by the first force-torque multi-component measurement device are assigned to the second 3D body, and wherein the optic-visual and/or acoustic indicating device indicates, in an optic-visual way and/or acoustically, the region, spot or element touched by the person.

2. A teaching and learning device according to claim 1, wherein the optic-visual indicating device comprises a projector projecting visual data directly to the area touched.

3. A teaching and learning device according to claim 2, wherein the projector is a video projector.

4. A teaching and learning device according to claim 2 wherein the visual data includes texts or images.

5. A teaching and learning device according to claim 1, wherein the person touches the 3D model by his or her hands.

* * * * *